(12) United States Patent
Wolf-Molnar et al.

(10) Patent No.: US 11,752,464 B2
(45) Date of Patent: Sep. 12, 2023

(54) RANKINE VORTEX PARTICLE SEPARATOR SYSTEMS AND METHODS

(71) Applicant: SONUS Engineered Solutions, Warren, MI (US)

(72) Inventors: Pal Marton Wolf-Molnar, Grosse Pointe Woods, MI (US); Tim Droege, Macomb, MI (US); Gang Lu, Windsor (CA)

(73) Assignee: Sonus Engineered Solutions, Warren, MI (US)

( * ) Notice: Subject to any disclaimer, the term of this patent is extended or adjusted under 35 U.S.C. 154(b) by 0 days.

(21) Appl. No.: 17/526,277

(22) Filed: Nov. 15, 2021

(65) Prior Publication Data

US 2022/0152545 A1     May 19, 2022

Related U.S. Application Data

(60) Provisional application No. 63/113,320, filed on Nov. 13, 2020.

(51) Int. Cl.
| | |
|---|---|
| *B01D 45/16* | (2006.01) |
| *B01D 50/20* | (2022.01) |
| *B01D 46/00* | (2022.01) |
| *B04C 5/081* | (2006.01) |
| *B04C 9/00* | (2006.01) |

(Continued)

(52) U.S. Cl.
CPC ............. *B01D 50/20* (2022.01); *B01D 45/16* (2013.01); *B01D 46/0005* (2013.01); *B01D 46/0043* (2013.01); *B04C 5/081* (2013.01);

*B04C 9/00* (2013.01); *B01D 2279/60* (2013.01); *B04C 2009/004* (2013.01); *F02M 35/0201* (2013.01);

(Continued)

(58) Field of Classification Search
CPC .... B01D 50/20; B01D 45/16; B01D 46/0005; B01D 46/0043; B01D 2279/60; B01D 46/10; B04C 5/081; B04C 9/00; B04C 2009/004; B04C 5/13; B04C 5/15; F02M 35/0201; F02M 35/02416; F02M 35/10144; F02M 35/0216; F02M 35/0223; F02M 35/0226
See application file for complete search history.

(56) References Cited

U.S. PATENT DOCUMENTS

| | | | | |
|---|---|---|---|---|
| 4,486,206 A | * | 12/1984 | Miyakawa ............. | B01D 50/20 55/498 |
| 4,514,193 A | * | 4/1985 | Booth ..................... | B01D 50/20 55/290 |

(Continued)

FOREIGN PATENT DOCUMENTS

GB           2584510 A * 12/2020 ............... A47L 5/22

*Primary Examiner* — Dung H Bui
(74) *Attorney, Agent, or Firm* — Carlson, Gaskey & Olds, P.C.

(57) ABSTRACT

A particle separator assembly includes an airbox providing an outer tapered portion tapering from a first section having a first cross sectional area to a first opening having a second cross sectional area less than the first cross sectional area. The example assembly includes a flow diverter providing an inner tapered portion that tapers to a second opening. The example assembly includes an air filter housed by the airbox, the air filter is spaced from the second opening in a first direction, and the first opening is spaced from the second opening in a second direction opposite the first direction.

6 Claims, 4 Drawing Sheets

US 11,752,464 B2

Page 2

(51) Int. Cl.
*F02M 35/10* (2006.01)
*F02M 35/024* (2006.01)
*F02M 35/02* (2006.01)

(52) U.S. Cl.
CPC . *F02M 35/02416* (2013.01); *F02M 35/10144* (2013.01)

(56) References Cited

U.S. PATENT DOCUMENTS

| | | | | |
|---|---|---|---|---|
| 5,403,367 | A | * | 4/1995 | De Villiers .......... B01D 39/163 55/320 |
| 5,480,464 | A | * | 1/1996 | De Villiers ........ B01D 39/1615 55/320 |
| 8,657,903 | B2 | * | 2/2014 | Menssen ............ F02M 35/0223 55/504 |
| 2012/0167336 | A1 | * | 7/2012 | Tran ........................ A47L 9/122 15/347 |
| 2014/0237965 | A1 | * | 8/2014 | Conrad ..................... A47L 5/26 55/447 |
| 2019/0307301 | A1 | * | 10/2019 | Conrad ..................... A47L 9/22 |
| 2020/0173402 | A1 | * | 6/2020 | Sudou .............. F02M 35/02416 |
| 2020/0309073 | A1 | * | 10/2020 | Finn ................. F02M 35/10393 |
| 2021/0060471 | A1 | * | 3/2021 | Ozono ................ B01D 46/521 |
| 2021/0236975 | A1 | * | 8/2021 | Wolf-Molnar ......... B01D 45/16 |
| 2021/0239078 | A1 | * | 8/2021 | Jang ....................... F02M 25/06 |

* cited by examiner

RANKINE VORTEX PARTICLE SEPARATOR SYSTEMS AND METHODS

CROSS-REFERENCE TO RELATED APPLICATION

This application claims priority to U.S. Provisional Application No. 63/113,320, filed Nov. 13, 2020.

BACKGROUND

Vehicles, such as automobiles, heavy trucks, agricultural vehicles, commercial vehicles, as well as water and air vehicles, include air intake systems for providing air flow to their engines.

SUMMARY

A particle separator assembly according to an example of this disclosure includes an airbox providing an outer tapered portion tapering from a first section having a first cross sectional area to a first opening having a second cross sectional area less than the first cross sectional area. The example assembly includes a flow diverter providing an inner tapered portion that tapers to a second opening. The example assembly includes an air filter housed by the airbox, the air filter is spaced from the second opening in a first direction, and the first opening is spaced from the second opening in a second direction opposite the first direction.

In a further example of the foregoing, the flow diverter is a separate, drop-in component.

In a further example of any of the foregoing, the first opening and second opening are centered about a common axis.

In a further example of any of the foregoing, the first opening has a circular cross section.

In a further example of any of the foregoing, the second opening has a circular cross section.

In a further example of any of the foregoing, the second opening has a third cross sectional area greater than the second cross sectional area.

In a further example of any of the foregoing, a radially outer surface of the inner tapered portion has a concave curvature, and a radially inner surface of the inner tapered portion has a convex curvature.

In a further example of any of the foregoing, a duckbill is provided at the first opening.

An air intake system according to an example of this disclosure includes an airbox providing an outer tapered portion tapering from a first section having a first cross sectional area to a first opening having a second cross sectional area less than the first cross sectional area. A flow diverter provides an inner tapered portion that tapers to a second opening. An air filter is housed by the airbox, the air filter is spaced from the second opening in a first direction, and the first opening is spaced from the second opening in a second direction opposite the first direction. An intake duct is fluidly connected to the airbox at a first connection opening. A clean air duct is fluidly connected to the airbox at a second connection opening spaced from the first connection opening in the first direction.

In a further example of the foregoing, the flow diverter is a separate, drop-in component.

In a further example of any of the foregoing, the first opening and second opening are centered about a common axis.

In a further example of any of the foregoing, the intake duct is positioned in an offset position relative to a center of the airbox.

In a further example of any of the foregoing, the second opening has a third cross sectional area greater than the second cross sectional area.

In a further example of any of the foregoing, a radially outer surface of the inner tapered portion has a concave curvature, and a radially inner surface of the inner tapered portion has a convex curvature.

In a further example of any of the foregoing, the first opening has a circular cross section.

In a further example of any of the foregoing, the second opening has a circular cross section.

In a further example of any of the foregoing, a duckbill is provided at the first opening.

These and other features may be best understood from the following specification and drawings, the following of which is a brief description.

DETAILED DESCRIPTION

This disclosure relates generally to air intake and particle separator systems and methods for providing air flow to vehicle engines. In some examples, the particles may include sand, dust, or other like solid or liquid particles.

Figure 1:
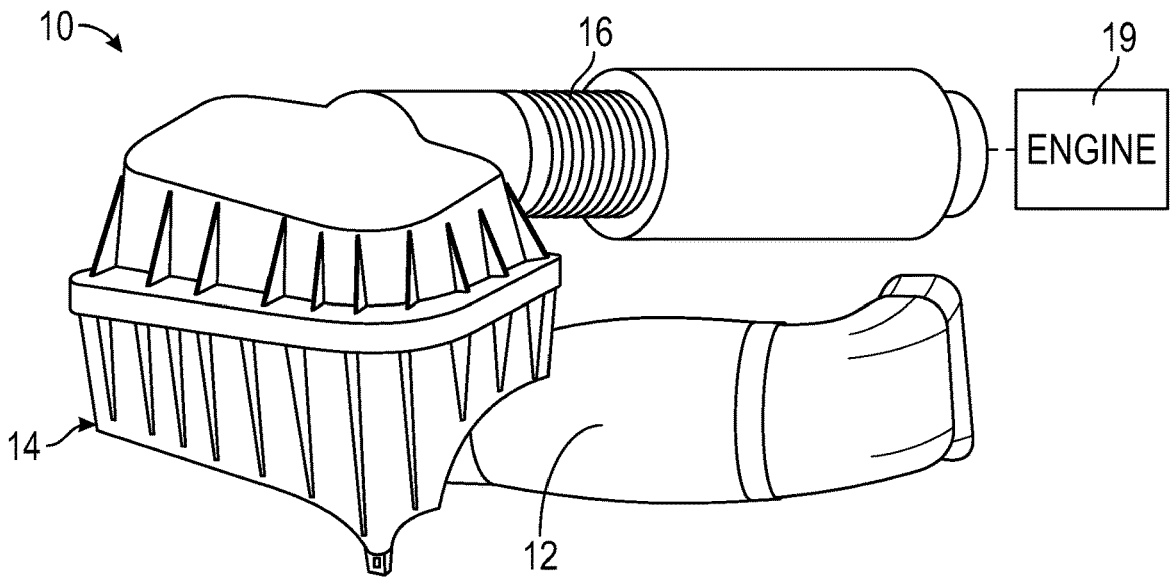
FIG. 1 illustrates an example air intake system.

FIG. 1 illustrates an example air intake system 10 for a vehicle. The vehicle may include any of automobiles, heavy trucks, agricultural vehicles, commercial vehicles, as well as water and air vehicles, in some examples. The example intake system 10 includes an intake duct 12, a particle separator assembly 14, and a clean side duct 16. In the example shown, the general flowpath of air flows from the intake duct 12, through the particle separator assembly 14, and then through the clean side duct 16, and eventually to the vehicle engine 19 (shown schematically).

Figure 2:
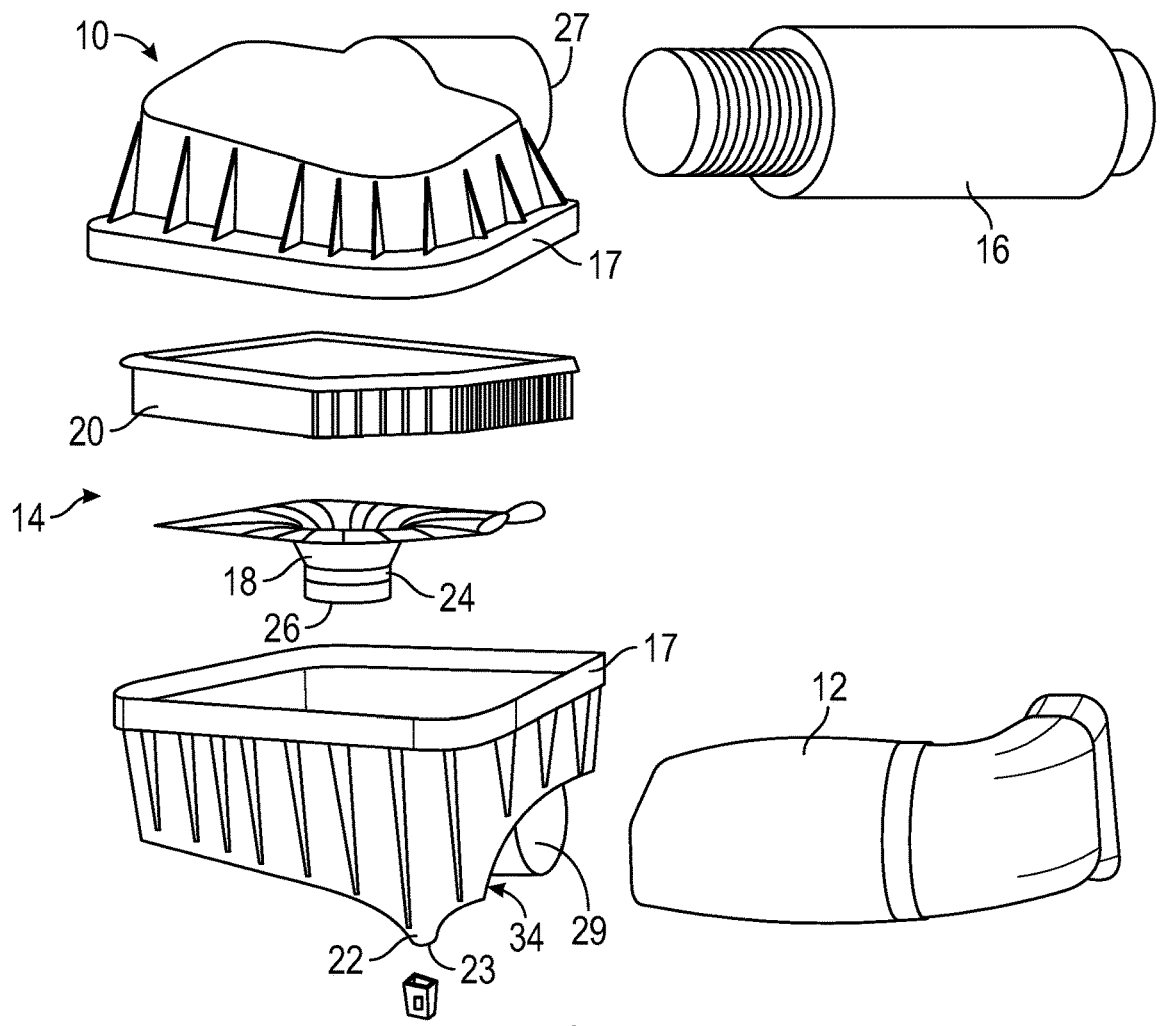
FIG. 2 illustrates an exploded view of the example system of FIG. 1.

FIG. 2 illustrates an exploded view of the example intake system 10 shown in FIG. 1. The example particle separator assembly 14 includes an airbox 17 that houses a drop-in flow diverter 18 and an air filter 20. That is, in some examples as shown, the flow diverter 18 is a drop-in component separate from the airbox 17. The airbox 17 may provide an outer tapered portion 22 tapering to an opening 23. The flow diverter 18 may provide an inner tapered portion 24 tapering to an opening 26. In some examples, as shown, when assembled, the inner tapered portion 24 is at least partially nested within the outer tapered portion 22. The example airbox 17 includes a connection opening 27 for fluidly connecting to the clean side duct 16 and a connection opening 29 for fluidly connecting to the intake duct 12. In some examples, the opening 26 has a greater cross-sectional area than the opening 23. The smaller opening 23 makes the axial trajectory turn towards the larger main airflow outlet, without stopping the swirling motion.

Figure 3A:
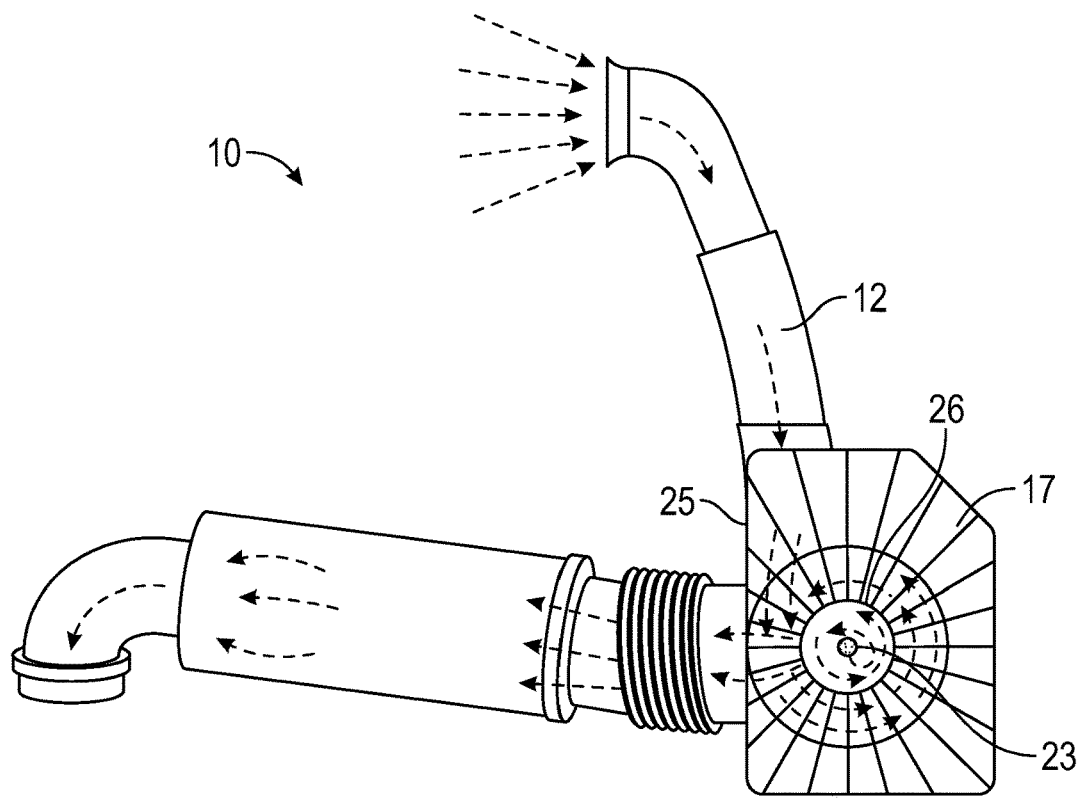
FIG. 3A illustrates a horizontal section view through the example system of FIGS. 1 and 2.

FIG. 3A illustrates a horizontal section view through the system 10. As shown in the example, the air enters the airbox 17 from the intake duct 12 and swirls around within the airbox 17. In some examples, as shown, the air swirls counterclockwise when viewed from above as shown. In some examples, as shown, the intake duct 12 is positioned in an offset position relative to the center of the airbox 17. In some examples, the offset position allows air flowing from the intake duct 12 and into the airbox 17 to flow adjacent a side surface 25 of the airbox 17. The example offset positions aid in initiating the swirling airflow shown, the benefit of which is discussed further below.

In some examples, as shown, the opening 23 has a circular cross section to assist in the swirling airflow. In some examples, the opening 26 may also have a circular cross section, but other shapes are contemplated, such as the opening 23 being circular and the opening 26 being non-circular.

Figure 3B:
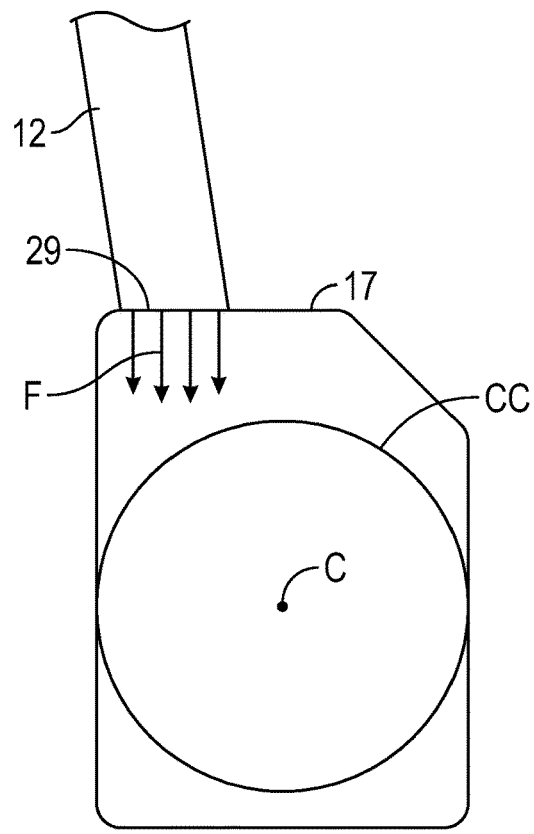
FIG. 3B schematically illustrates an offset relationship of the example system of FIGS. 1-3.

FIG. 3B schematically illustrates an example of the offset of the intake duct 12 and opening 29 with respect to the airbox 17. There is a maximum circle CC inscribed within the airbox 17 in the cross-sectional plane shown and having a center C. The duct 12 and opening 29 are positioned such that most of the airflow F entering the airbox from the intake duct 12 is directed outside of the center C in order to initiate a swirling airflow.

Figure 4:
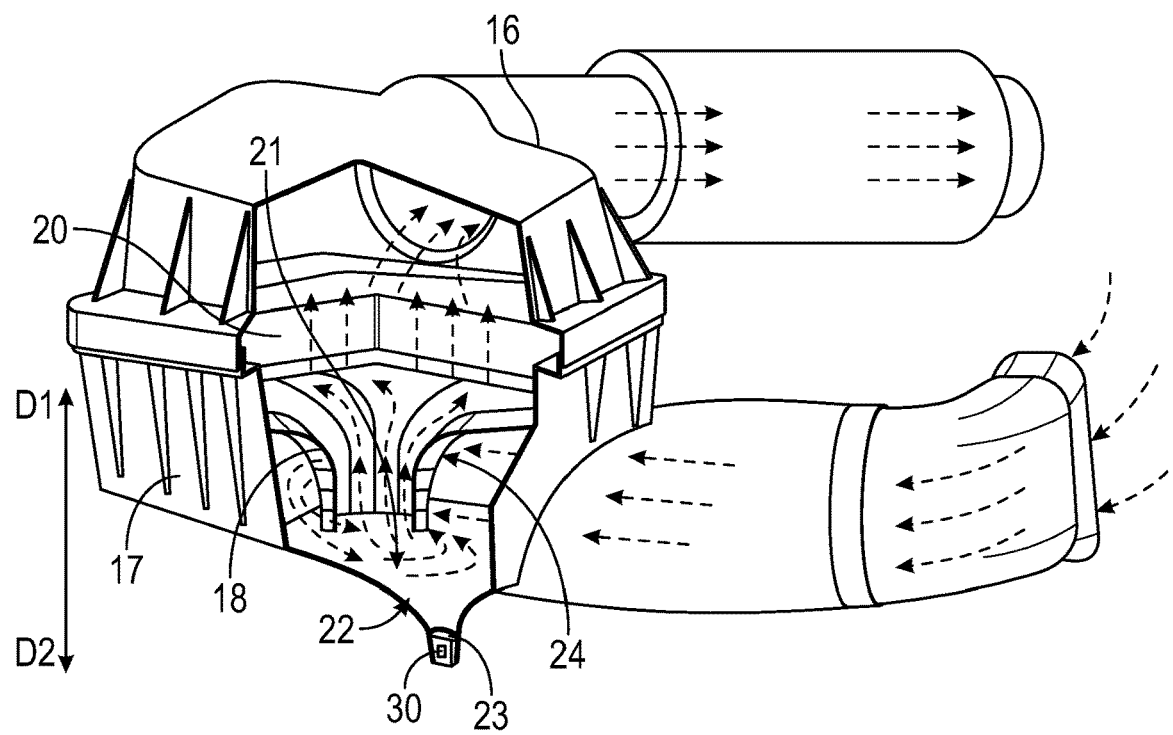
FIG. 4 illustrates a sectional view of the example system of FIGS. 1-3B.

Referring to FIG. 4, the air gradually flows to lower and lower levels (with reference to the orientation shown in FIG. 4) in a swirling flow between the airbox 17 and the flow diverter 18. Specifically, the air flows between the outer and inner tapered portions 22, 24 in a swirling motion. As the air flow path gets lower relative to the flow diverter 18, the swirl diameter slowly reduces due to the outer tapered portion 22, increasing the air's flow velocity, and forcing the air into a central portion 21 of the outer tapered portion 22 below the flow diverter 18. At the higher velocity, sudden vertical acceleration in the airflow separates the heavier particles from the main air trajectory, i.e., the heavier particles within the air cannot make this upward turn, so they collect at the opening 23, while the cleaner air rises when it reaches the central portion 21, while still swirling. The air then flows upward through the interior portion of the flow diverter 18 and then flows across the air filter 20 and to the clean side duct 16. The flow diverter 18 therefore acts as a particle separator on the airflow prior to the airflow reaching the air filter 20.

In some examples, as shown, a duckbill 30 may be provided at the opening 23 for removal of the settled particles. In some examples, the duckbill 30 may be any of the one or more of the embodiments disclosed in U.S. Patent Application Publication No. US 2021/0236975 (priority applications 62/969,717 and Ser. No. 17/167,439) incorporated herein by reference.

Referring to FIGS. 3A and 4, the air swirls counterclockwise as it flows down toward the opening 23 and then as it flows upward through the central portion 21. However, since the main trajectory of the airflow changed from downwards to upwards, a double-vortex type flow is created. That is, as the main trajectory of the flow changes from downward to upward, the swirl switches from Right-Hand swirl to Left-Hand swirl (this can be visualized by pointing one's thumb towards the main trajectory of the airflow and one's fingers pointing towards the swirling direction). This makes the flow a Rankine (or double) vortex.

Figure 5:
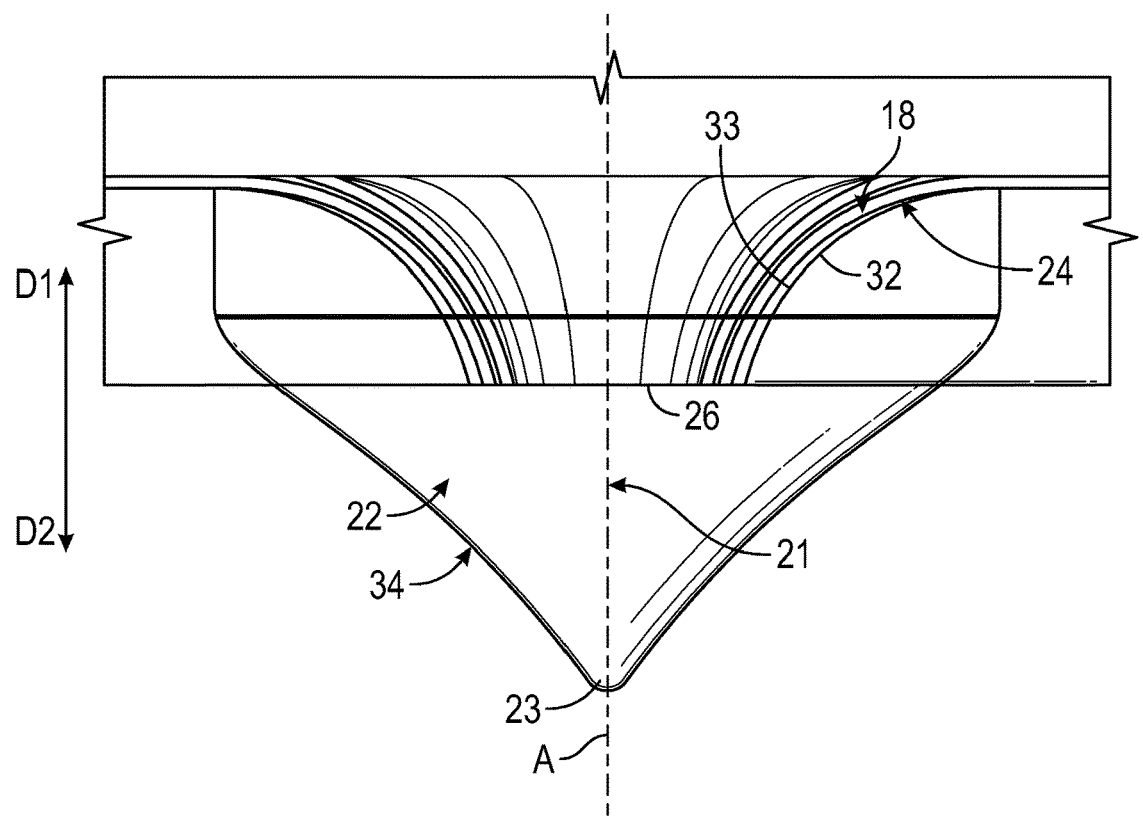
FIG. 5 illustrates a transparent view of the example flow diverter and outer tapered portion.

FIG. 5 illustrates a cross sectional view of the example flow diverter 18 and outer tapered portion 22. The example flow diverter 18 provides the inner tapered portion 24, tapering to the opening 26 at the bottom of the inner tapered portion 24 (with respect to the orientation in the figure). As shown in the example, the opening 23 of the outer tapered portion 22 is below the opening 26 with respect to the orientation shown.

Referring back to FIG. 4, the air flows in a spiraling flowpath downward along the inner surface of the outer tapered portion 22, and heavy particles from the air collect at the opening 23. The opening 23 may be covered with a duckbill 30 or similar feature that can be periodically removed to access the opening 23 for cleaning. As the airflow reaches the central portion 21, it begins to spiral upwards through the opening 26 provided by the inner tapered portion 24. The air may then flow upward across the air filter 20 before exiting the airbox 17. In some examples, there may be one or more additional components (not shown) adjacent the air filter 20, such as a Hydrocarbon absorber in some examples.

In some examples, as shown in FIG. 5, the outer surface 32 of the inner tapered portion 24 has a concave curvature, while the inner surface 33 has a convex curvature. In come examples, as shown, the openings 23 and 26 are centered on a common axis A.

In some examples, the flow diverter 18 is a drop-in piece, such that the system 10 also functions without the flow diverter 18. In this regard, it may be simple and inexpensive to tune to increase or reduce the separator efficiency and flow restriction as needed, by providing or omitting the flow diverter 18.

Figure 6:
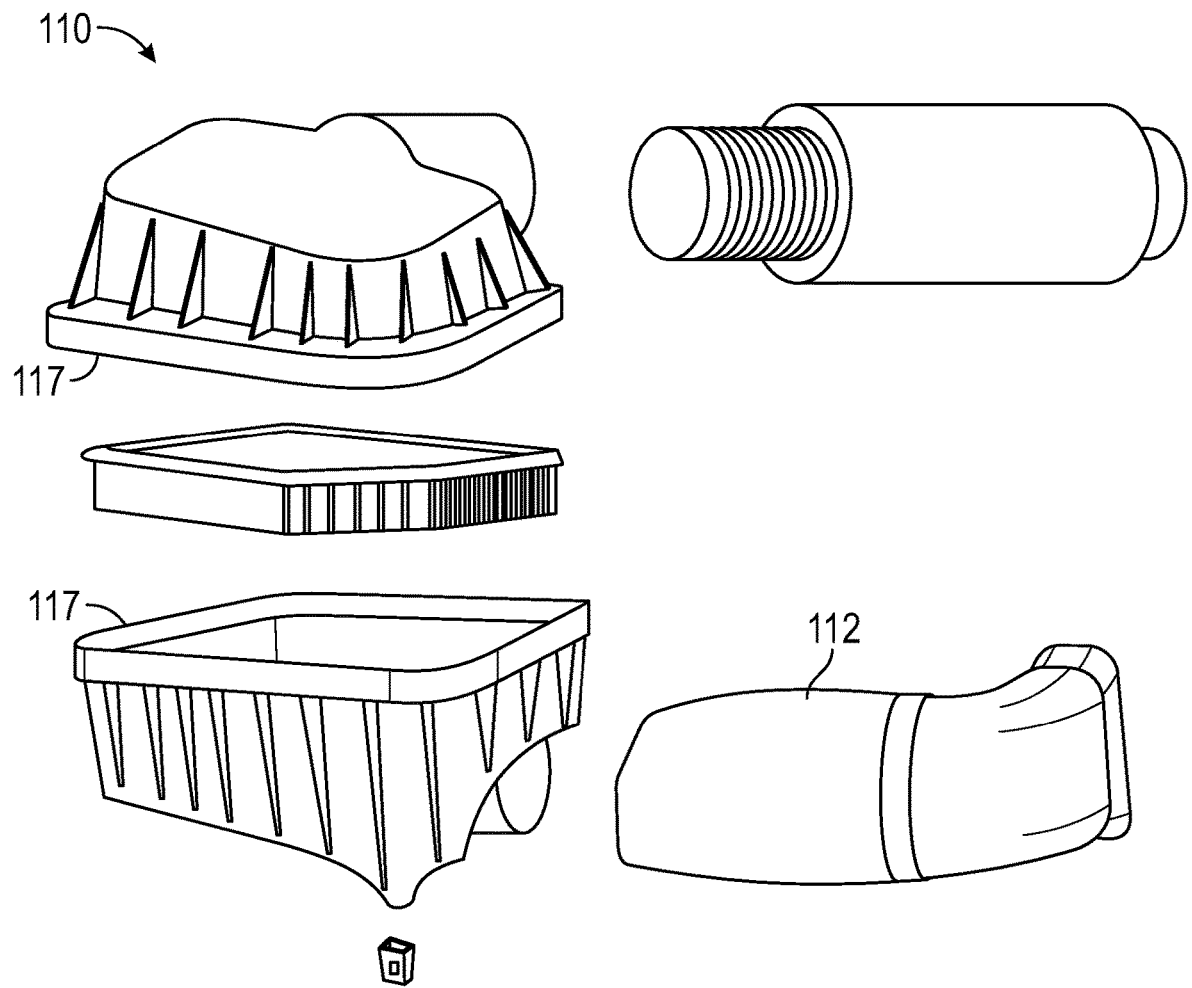
FIG. 6 illustrates an exploded view of another example air intake system.

FIG. 6 illustrates an exploded view of an example air intake system 110 substantially similar to the example air intake system 10, except that it does not include a flow diverter. Applicant has determined that the system 110 achieves some separator efficiency due to the taper of the airbox 117 and the offset of the intake duct 112. The system 110 may also achieve reduced flow restriction compared to the air intake system 110 in some examples.

An example particle separator system can be said to include an airbox providing an outer tapered portion tapering from a first section 34 (see FIGS. 2, 5) having a first cross sectional area to a first opening 23 having a second cross sectional area (see cross sectional area of the opening 23 shown in FIG. 3A) less than the first cross sectional area. A flow diverter provides an inner tapered portion that tapers to a second opening. An air filter is housed by the airbox, and the air filter is spaced from the second opening in a first direction D1 (FIGS. 4 and 5). The first opening is spaced from the second opening in a second direction D2 opposite the first direction D1.

An example air intake system can be said to include an airbox providing an outer tapered portion tapering from a first section 34 (see FIG. 5) having a first cross sectional area to a first opening 23 having a second cross sectional area see cross sectional area of the opening 23 shown in FIG. 3A) less than the first cross sectional area. A flow diverter provides an inner tapered portion that tapers to a second opening. An air filter is housed by the airbox, and the air filter is spaced from the second opening in a first direction D1 (FIGS. 4 and 5). The first opening is spaced from the second opening in a second direction D2 opposite the first direction D1. An intake duct is fluidly connected to the airbox at a first connection opening. A clean air duct fluidly connected to the airbox at a second connection opening spaced from the first connection opening in the first direction.

The foregoing description shall be interpreted as illustrative. A worker of ordinary skill in the art would understand that certain modifications could come within the scope of this disclosure. Various examples of the disclosure have been described. Any combination of the described systems, operations, or functions is contemplated. It is possible to use some of the components or features from any of the examples in combination with features or components from any of the other examples.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An air intake system for a vehicle, comprising:
an airbox providing an outer tapered portion tapering from a first section having a first cross sectional area to a first opening having a second cross sectional area less than the first cross sectional area;
a flow diverter providing an inner tapered portion that tapers to a second opening, the flow diverter being a separate drop-in component, wherein a radially outer surface of the inner tapered portion has a concave curvature, and a radially inner surface of the inner tapered portion has a convex curvature;
an air filter housed by the airbox, wherein the air filter is spaced from the second opening in a first direction, and the first opening is spaced from the second opening in a second direction opposite the first direction;
an intake duct fluidly connected to the airbox at a first connection opening provided at the outer tapered portion, and positioned in an offset position relative to a center of the airbox directed outside of the center to initiate a swirling airflow;
a clean air duct fluidly connected to the airbox at a second connection opening spaced from the first connection opening in the first direction; and
a duckbill nozzle valve provided at the first opening for removal of particles from the airbox, the duckbill nozzle valve including a valve tapered portion and two opposing lips extending from the valve tapered portion, wherein the lips remain closed when an engine of the vehicle is on, but are openable when the engine is off for removal of particles.

2. The air intake system as recited in claim 1, wherein the first opening and second opening are centered about a common axis.

3. The air intake system as recited in claim 1, wherein the second opening has a third cross sectional area greater than the second cross sectional area.

4. The air intake system as recited in claim 1, wherein the first opening has a circular cross section.

5. The air intake system as recited in claim 1, wherein the second opening has a circular cross section.

6. The air intake system as recited in claim 1, wherein the inner tapered portion is at least partially nested within the outer tapered portion.

* * * * *